United States Patent [19]

Sachs

[11] Patent Number: 4,477,948
[45] Date of Patent: Oct. 23, 1984

[54] DEAD-END MESSENGER WIRE HOLDER

[76] Inventor: Isaac Sachs, 1240 Ridgewood Dr., Chomedey, Laval, Quebec, Canada, H7W 1L3

[21] Appl. No.: 477,387

[22] Filed: Mar. 21, 1983

[51] Int. Cl.$^3$ .............................................. F16G 11/00
[52] U.S. Cl. ............................... 24/115 R; 24/115 K; 24/129 R; 24/129 A
[58] Field of Search ............. 24/115 R, 129 R, 129 A, 24/129 B, 115 H, 115 K, 122.3

[56] References Cited

U.S. PATENT DOCUMENTS

| | | | |
|---|---|---|---|
| 520,318 | 5/1894 | Knap | 24/115 R |
| 670,552 | 3/1901 | Brown | 24/129 A |
| 817,557 | 4/1906 | Hatherly et al. | 24/129 A |
| 1,463,456 | 7/1923 | Bear | 24/129 R |
| 1,478,955 | 12/1923 | Harrison et al. | 24/3 M |
| 1,480,006 | 1/1924 | Ortman | 24/129 R |
| 1,979,756 | 11/1934 | McNamee et al. | 24/115 R |
| 2,973,537 | 3/1961 | Simpson | 24/115 R |
| 3,066,372 | 12/1962 | Parker | 24/129 R |
| 3,520,988 | 7/1970 | Ballock, Sr. | 24/129 B |
| 4,414,712 | 11/1983 | Beggins | 24/129 R |

FOREIGN PATENT DOCUMENTS 982787 2/1976 Canada .

Primary Examiner—Victor N. Sakran
Attorney, Agent, or Firm—Schwartz, Jeffery, Schwaab, Mack, Blumenthal & Koch

[57] ABSTRACT

The invention is concerned with a device for holding a cable suspended from a support, the cable having an aerial support wire connected therealong for supporting same with an end portion thereof securely held by the device. The device of the invention comprises an open-ended tubular member having an inlet end and an outlet end for receiving the cable and support wire therethrough with the end portion of the support wire extending beyond the outlet end and separated from the cable, wire retention means integral with the tubular member for securing the wire end portion to the tubular member and means for connecting the tubular member to the support such that the tubular member lies at a predetermined distance from the support. This device enables an aerial support wire, such as the steel messenger wire of a messenger coaxial cable used in the cable TV industry, to be securely held at the dead-end thereof while preventing the cable from undergoing further separation from the messenger wire when separating forces are exerted thereon.

15 Claims, 10 Drawing Figures

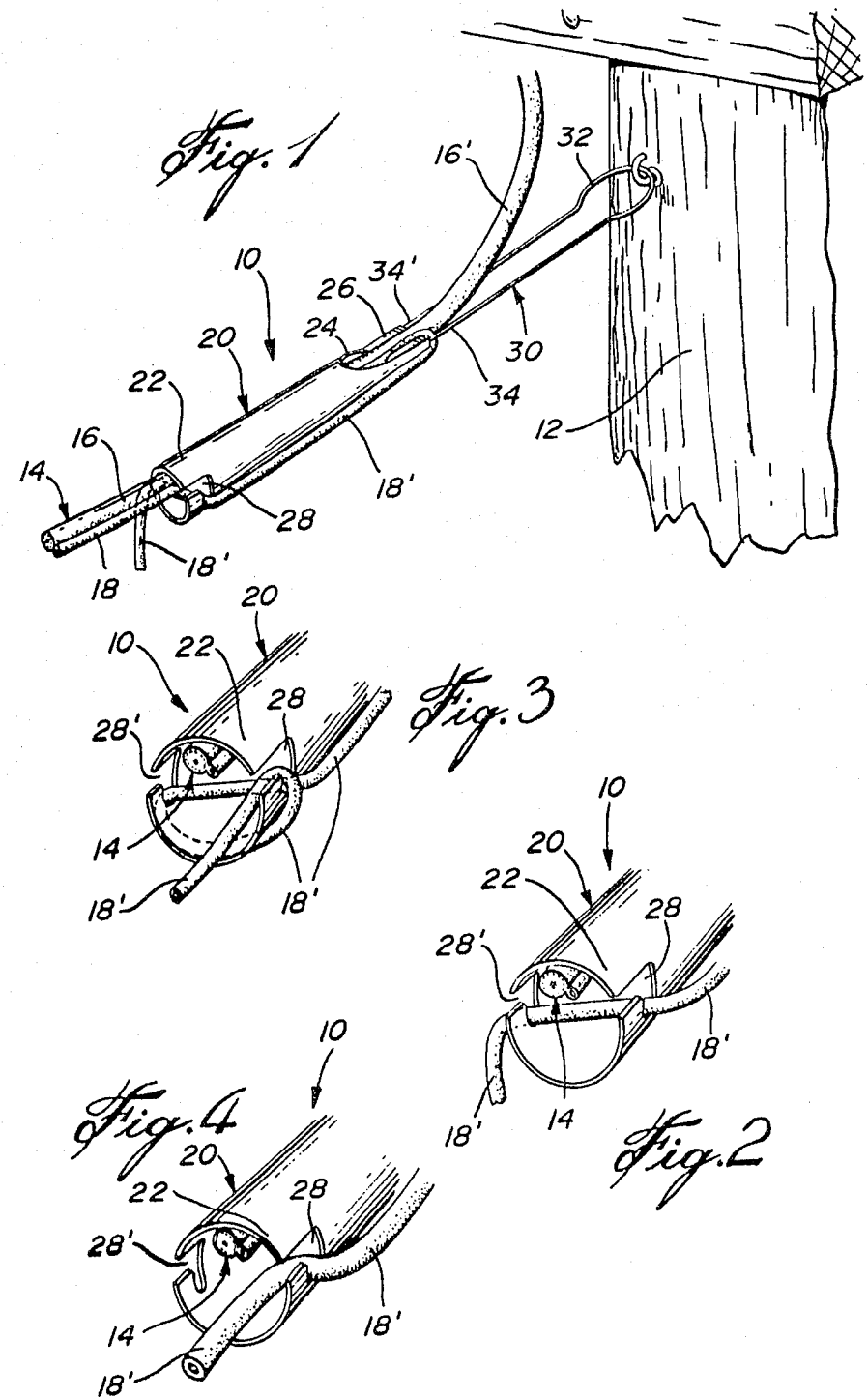

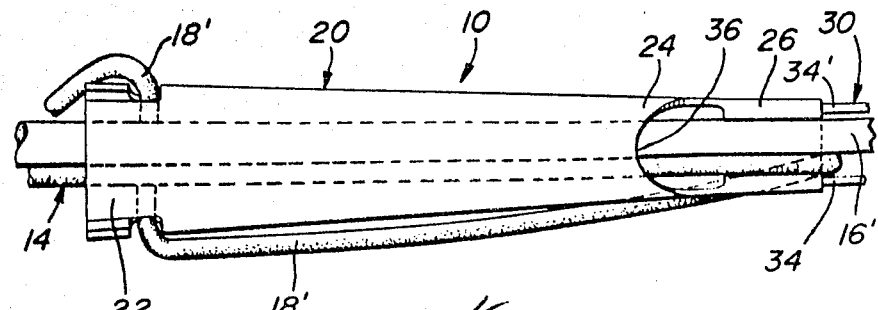
Fig. 5
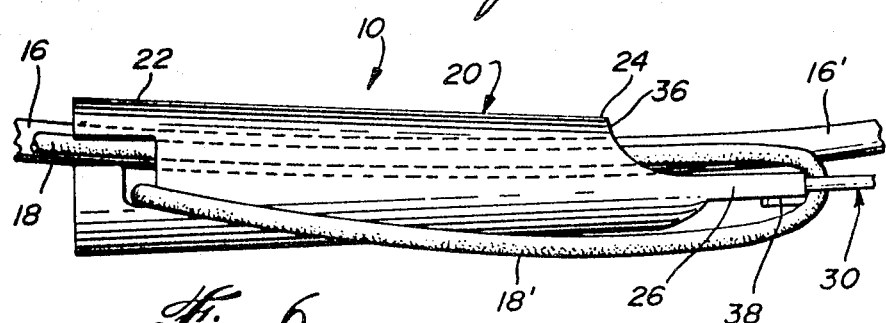
Fig. 6
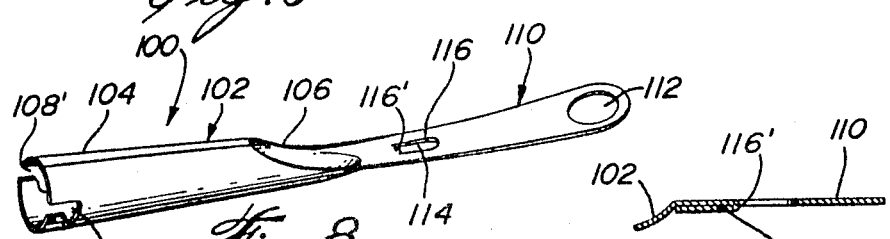
Fig. 8  Fig. 8A
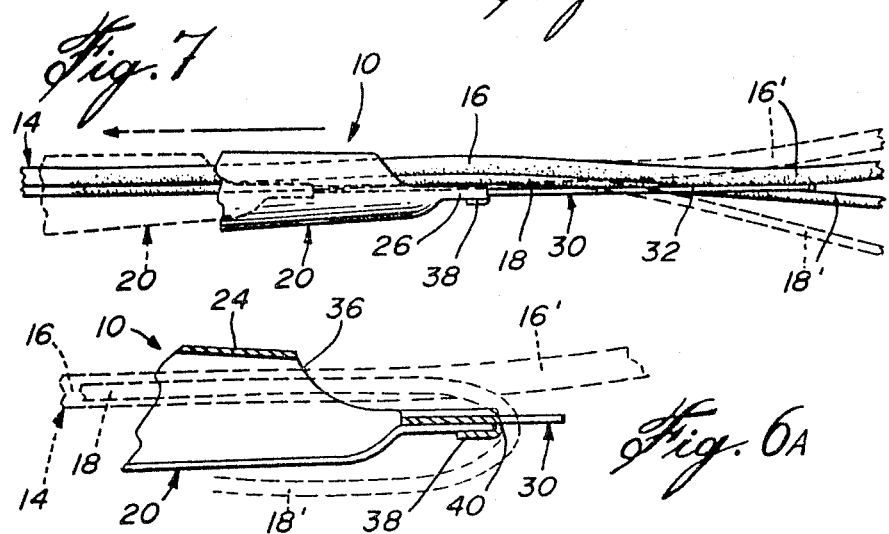
Fig. 7
Fig. 6A

DEAD-END MESSENGER WIRE HOLDER

BACKGROUND OF THE INVENTION

The present invention relates to a device for holding a cable suspended from a support, and more particularly a cable of the type having an aerial support wire connected therealong for supporting same, such as the steel messenger coaxial cable used in the cable TV industry.

Applicant has already described in his Canadian Patent No. 982,787 of Feb. 3, 1976 a wedge clamp for securing a coaxial television cable to a support. This wedge clamp comprises a conical body member formed with a longitudinal outer groove having a depth smaller than the diameter of the cable for receiving the cable such as to leave a cable portion protruding therefrom, and a conical wedge sleeve for mounting over the body member and formed with a longitudinal slot for passing the cable therethrough. The conical body member is also provided at its smaller end with means for connecting it to a support. Thus, in use, the wedge sleeve is mounted over the body member with the slot in axial alignment with the groove, the cable is inserted in the groove through the slot and the sleeve is rotated over the body member to clamp the cable therebetween.

Since nowdays coaxial TV cables are generally no longer used alone but rather in combination with a steel messenger wire which is connected therealong by means of the PVC or rubber coating covering both the cable and messenger wire, for the purpose of supporting the cable suspended above ground between two remote connection points, Applicant's cable clamp described above cannot be used successfully to secure this type of cable to a support, such as a pole or a housing. As the primary purpose of the messenger wire is to support the cable suspended above ground and to thereby prevent axial tensions from being exerted along the cable, it is that wire which must be secured to the support, instead of the cable itself. Thus, when using Applicant's wedge clamp, sufficient clamping pressure cannot be exerted on the messenger wire owing to the difference in size between the messenger wire and the cable, the messenger wire having a much smaller diameter than the cable. As a result, the steel wire cannot be positively held and therefore has a tendency of slipping within its plastic jacket.

Other devices are also known for securing a guy wire to a support and have been used for holding a messenger coaxial cable suspended therefrom. One such device is the so-called guy thimble which consists of an elongated piece of metal bent to define an open loop and formed with a longitudinal outer groove for seatingly receiving over the loop a dead-end portion of the messenger wire which has been separated from the cable, with the dead-end of the wire being wound around the messenger wire itself adjacent the ends of the loop for positive securement. Due to the particular configuration of this device, the dead-end portion of the messenger wire often slips away during installation, thus rendering the latter difficult and time consuming. Different sizes of guy thimbles are also required for different sizes of messenger wires. Moreover, since the loop is generally small in diameter and is mounted over an eye bolt or hook secured to the support, the dead-end of the messenger wire is held close to the point of attachment to the support, resulting in fatigue or stress being induced in the nearby cable portion upon swinging movement of the attachment due to weather conditions. As the cable and messenger wire which remain connected together adjacent the winding of the wire dead-end portion over the loop are not positively retained together by any means other than their own plastic coating, they often undergo further separation when separating forces are exerted thereon.

Another known device consists of a preformed grip wire bent to define a closed loop and having elongated, twisted end portions adapted to be wound around the dead-end portion of the messenger wire. This grip wire basically suffers from the same disadvantages noted above in respect to the guy thimble, in addition to not being reusable.

SUMMARY OF THE INVENTION

It is therefore an object of this invention to overcome the aforementioned drawbacks and to provide a device for holding a cable of the above type suspended from a support, in such a manner that the aerial support wire can be securely held at the dead-end thereof while preventing the cable from undergoing separation from the support wire when separating forces are exerted thereon, as well as preventing fatigue or stress from being induced in the cable.

In accordance with the present invention, there is thus provided a device for holding a cable suspended from a support, the cable having an aerial support wire connected therealong for supporting same with an end portion thereof securely held by the device. The device of the invention comprises an open-ended tubular member having an inlet end and an outlet end for receiving the cable and support wire therethrough with the end portion of the support wire extending beyond the outlet end and separated from the cable, wire retention means integral with the tubular member for securing the wire end portion to the tubular member and means for connecting the tubular member to the support such that the tubular member lies at a predetermined distance from the support.

According to a particularly preferred embodiment, the wire retention means comprise at least one slot formed at the inlet end and having a first portion extending inwardly from the inlet end for receiving the wire end portion and a second portion extending substantially transversely to the first portion for captively retaining the wire end portion received through the first slot portion and into the second slot portion. Thus, in use, the end portion of the support wire extending beyond the outlet end is secured to the tubular member by bending the wire end portion adjacent the outlet end so as to extend exteriorly of the member in a direction towards the inlet end, inserting the wire end portion through the first slot portion and then into the second slot portion while applying a pulling force so as to cause the wire end portion to extend closely adjacent the tubular member between the ends thereof and to further bend at the second slot portion for captive retention therein.

The provision of an open-ended tubular member through which both the cable and support wire extend with the wire end portion being securely held thereby enables the retention force exerted by the wire retention means to be applied exclusively to the support wire, thus indirectly securing the cable via its support wire while providing to the cable portion separated from the support wire and extending beyond the outlet end full liberty of movement without any fatigue or stress induced therein. On the other hand, the body of the tubular member acts as a stopper to prevent the cable from undergoing any further separation from the support wire when separating forces are exerted thereon.

BRIEF DESCRIPTION OF THE DRAWINGS

Further features and advantages of the invention will become more readily apparent from the following description of preferred embodiments thereof as illustrated by way of example in the accompanying drawings, in which:

FIG. 1. is a perspective view of a device according to a preferred embodiment of the invention, as seen holding a messenger coaxial cable suspended from a pole;

FIG. 2 is a fragmentary perspective view of the device of FIG. 1, showing how the dead-end of the messenger wire is secured at the inlet end of the device;

FIG. 3 is a view similar to that of FIG. 2, showing how the dead-end of a messenger wire having a smaller size can be secured at the inlet end of the device;

FIG. 4 is another view similar to that of FIG. 2, showing how the dead-end of a messenger wire having a larger size can be secured at the inlet end of the device;

FIG. 5 is a top view of the device shown in FIG. 1;

FIG. 6 is a sideview of the same device;

FIG. 6A is a fragmentary longitudinal section of the device shown in FIG. 6;

FIG. 7 is a fragmentary sideview of the device of FIG. 1, showing how it can be used as a tool to separate the cable and messenger wire extending beyond the outlet end of the device;

FIG. 8 is a perspective view of another device according to a further preferred embodiment of the invention; and FIG. 8A is a fragmentary longitudinal section of the device shown in FIG. 8.

DESCRIPTION OF PREFERRED EMBODIMENTS

Referring first to the embodiment represented in FIGS. 1 through 7, there is illustrated in FIG. 1 a dead-end messenger wire holder which is generally designated by reference numeral 10 and seen hooked to a pole 12, holding a messenger cable 14 suspended therefrom. The messenger cable 14 includes a coaxial cable 16 operative to transmit a signal, for example a TV signal, and a steel messenger wire 18 which is connected to the cable 16 and extends therealong for supporting it; both the cable 16 and messenger wire 18 are held connected together by means of the PVC or rubber coating covering them.

The wire holder 10 comprises an open-ended tubular member 20 made of galvanized steel and having an inlet end 22 and an outlet end 24, through which the messenger cable 14 extends. The tubular member 20 has a conical configuration tapering towards the outlet end 24, and is provided at its outlet end with an outwardly projecting abutment 26. The abutment 26 is planar and lies in a plane extending substantially along the central axis of the tubular member 20, as best shown in FIG. 6. A pair of L-shaped slots 28 and 28' are provided at the inlet end 22 and are arranged diametrically opposite one another. An elongated hooking member 30 consisting of a metallic wire bent to define a hooking loop 32 and having the ends 34 and 34' thereof crimped in the abutment 26 serves as a connecting means for connecting the tubular member 20 to the pole 12. As shown, the hooking member 30 extends along the longitudinal axis of the tubular member 20 and connects the member 20 to the pole 12 such that it lies at a predetermined distance from the pole 12.

The L-shaped slots 28 and 28' which are provided at the inlet end 22 of the tubular member 20 serve as means for securing the dead-end of the messenger wire to the member 20. Each slot has a wire receiving portion extending inwardly from the inlet end 22 and along the longitudinal axis of the tubular member 20, and a wire retaining portion extending perpendicularly to the wire receiving portion. As shown in FIGS. 1 and 2, the dead-end portion 18' of the messenger wire extending beyond the outlet end and separated from the cable portion 16' is secured to the tubular member 20 by first bending the wire end portion 18' over the outer edge of the abutment 26 between the spaced-apart ends 34 and 34' of the hooking member 30, so as to extend exteriorly of the tubular member 20 in a direction towards the inlet end 22 thereof. Next, the wire end portion 18' is inserted through the wire receiving portions of the slots 28 and 28' and then into the wire retaining portions thereof while applying a pulling force so as to cause the wire end portion 18' to extend closely adjacent the tubular member 20 between the ends 22 and 24 thereof and to further bend at each slot for captive retention therein.

The securing arrangement shown in FIG. 2 is particularly useful for securing the dead-end of a messenger wire of medium size, that is, having a diameter of about 0.062 inch; in this case, the wire end portion 18' is securely retained by the provision of two anchoring points, one at each slot. On the other hand, when use is made of a messenger wire of smaller size, that is, having a diameter of about 0.051 inch, it is advantageous to insert the wire end portion 18' a second time into the slot 28, thereby providing three anchoring points for positively securing the dead-end of such messenger wire, as shown in FIG. 3. With a messenger wire of larger size, that is, having a diameter of about 0.081 inch, it is generally necessary to insert the wire end portion 18' only in one slot, such as the slot 28, as shown in FIG. 4; thus, in this case, only one anchoring point is needed since the stiffness of such messenger wire contributes to the positive securing of the wire in slot 28.

It should be noted that the open-ended tubular member 20 through which the messenger cable 14 extends with the dead end portion 18' of the messenger wire 18 being securely thereby enables the retention force exerted by the wire retaining slots 28 and 28' to be applied exclusively to the messenger wire 18, thus indirectly securing the cable 16 via its messenger wire 18 while providing to the cable portion 16' separated from the wire end portion 18' and extending beyond the outlet end 24 of the member 20 full liberty of movement without any fatigue or stress induced therein. The body of the tubular member 20, on the other hand, acts as a stopper to prevent the cable 16 from undergoing any further separation from the messenger wire 18 when separating forces are exerted thereon.

As best shown in FIGS. 5 and 6, the outlet opening 36 which is provided at the outlet end 24 of the tubular member 20 and captively retains the cable 16 and messenger wire 18 together is angularly inclined relative to the longitudinal axis of the member 20. As also shown, the peripheral end edge of the member at the outlet opening 36 merges with the abutment 26.

In order to prevent the outer edge of the abutment 26 from damaging the PVC or rubber jacket covering the messenger wire which is bent thereover, the abutment 26 is provided an inwardly bent extension 38 which is curved to define a rounded folding edge 40, as best shown in FIG. 6A. On the other hand, the hooking member 30 which extends from the abutment 26 has its ends 34 and 34' crimped in the abutment with a retaining force capable of sustaining a load up to about 300 pounds. This feature enables the connection between the tubular member 20 and the hooking member 30 to yield when the messenger cable 14 is impacted for instance by a moving truck or a falling tree, thus avoiding damage to the pole 12 or other support.

FIG. 7 shows how the device 10 can be advantageously used as a tool to separate the cable 16 and messenger wire 18 from one another immediately prior to securing the dead-end portion 18' of the messenger wire to the tubular member 20. As shown, after having inserted the messenger cable 14 through the tubular member 20 and separated only the ends of the cable and messenger wire with conventional means such as a knife or a rasor blade, the hooking loop 32 of the hooking member 30 is inserted between the separated ends which are then grasped with one's hand and the member 20 is grasped with the other hand and pulled in the direction shown by the arrow in FIG. 7, so as to cause further separation of the cable and messenger wire. Owing to the circular cross-section of the metallic wire constituting the hooking member 30, the cable and messenger wire can thus be separated to the desired length, without damage to their PVC or rubber jacket. It should also be noted that the wire end portion 18' which has been separated from the cable portion 16' is in a position ready for being bent over the outer edge of the abutment 26.

Turning to FIG. 8, there is illustrated another dead-end messenger wire holder 100 similar to the device 10 represented in FIGS. 1–7, comprising an open-ended tubular member 102 of conical configuration and having an inlet end 104 and an outlet end 106 with L-shaped wire retaining slots 108 and 108' at the inlet end. However, instead of having a hooking member in the form of a wire loop connected to the tubular member as in the device 10, the embodiment of FIG. 8 has an elongated hooking member 110 which is solidary with the tubular member 102. The hooking member 110 is provided with an eyelet 112 adjacent the hooking end thereof and with a slot 114 adjacent the outlet end 106 of the tubular member 102. The inner peripheral edge 116 which is defined by the slot 114 in the hooking member 110 includes a folding edge portion 116' adjacent the outlet end 106 for enabling the dead-end portion of the messenger wire to be bent thereover after having been inserted in the slot 114, and to be thereafter secured to the tubular member 102 by means of the slots 108 and 108' similarly as in FIGS. 2–4. As best shown in FIG. 8A, the slot 114 is formed by cutting out a portion in the hooking member 110, the cut-out portion 118 being bent inwardly to provide to the folding edge portion 116' a rounded configuration, thus avoiding damage to messenger wire when it is bent thereover.

As it is apparent, the invention provides a dead-end messenger wire holder which is secure, convenient and easy to install.

I claim:

1. A device for holding a cable suspended from a support, said cable having an aerial support wire connected therealong for supporting same, said device comprising an open-ended tubular member having an inlet end and an outlet end for receiving said cable and support wire therethrough with an end portion of said support wire extending beyond said outlet end and separated from said cable, abutment means disposed adjacent said outlet end and substantially along the longitudinal axis of said tubular member for enabling said wire end portion to be bent adjacent said outlet end so as to extend exteriorly of said member in a direction towards said inlet end, wire retention means integral with said tubular member for enabling said wire end portion to be further bent and thereby secured to said tubular member and means for connecting said tubular member to said support such that said tubular member lies at a predetermined distance from said support, whereby said cable is indirectly held by said device via said aerial support having said end portion thereof secured to said tubular member.

2. A device for holding a cable suspended from a support, said cable having an aerial support wire connected therealong for supporting same with an end portion thereof securely held by said device, said device comprising an open-ended tubular member having an inlet end and an outlet end for receiving said cable and support wire therethrough with said end portion of said support wire extending beyond said outlet end and separated from said cable, wire retention means integral with said tubular member for securing said wire end portion to said tubular member and means for connecting said tubular member to said support such that said tubular member lies at a predetermined distance from said support, wherein said wire retention means comprise at least one slot formed at said inlet end and having a first portion extending inwardly from said inlet end for receiving said wire end portion and a second portion extending substantially transversely to said first portion for captively retaining said wire end portion received through said first slot portion and into said second slot portion, whereby said end portion of said support wire extending beyond said outlet end is secured to said tubular member by bending said wire end portion adjacent said outlet end so as to extend exteriorly of said member in a direction towards said inlet end, inserting said wire end portion through said first slot portion and then into said second slot portion while applying a pulling force so as to cause said wire end portion to extend closely adjacent said tubular member between the ends thereof and to further bend at said second slot portion for captive retention therein.

3. A device as claimed in claim 2, wherein said at least one slot is generally L-shaped and said first slot portion extends substantially along the longitudinal axis of said tubular member.

4. A device as claimed in claim 3, wherein there are two said generally L-shaped slots arranged opposite one another transversely of said tubular member, whereby said end portion of said support wire extending beyond said outlet end is secured to said tubular member by bending said wire end portion at said outlet end so as to extend exteriorly of said member in a direction towards said inlet end, inserting said wire end portion through the respective first portion of each said slot and then into the respective second portion thereof while applying a pulling force so as to cause said wire end portion to extend closely adjacent said tubular member between the ends thereof and to further bend at each said respective second slot portion for captive retention therein.

5. A device as claimed in claim 2, wherein said tubular member is provided at said outlet end with an outwardly projecting abutment extending substantially along the longitudinal axis of said member, said abutment having an outer folding edge for enabling said wire end portion to be bent thereover and to thereby provide said bending of said wire end portion adjacent said outlet end.

6. A device as claimed in claim 5, wherein said abutment is substantially planar and lies in a plane extending substantially along the central axis of said tubular member.

7. A device as claimed in claim 5, wherein said tubular member is provided at said outlet end with an outlet opening adapted to captively retain said cable and said support wire together and to thereby prevent further separation thereof when separating forces are exerted on said cable and support wire, said outlet opening being angularly inclined relative to the longitudinal axis of said member, and wherein said tubular member further has at said outlet opening a peripheral end edge merging with said abutment.

8. A device as claimed in claim 5, wherein said folding edge is rounded to avoid damaging said wire end portion bent thereover.

9. A device as claimed in claim 2, wherein said connecting means comprises an elongated hooking member extending substantially along the longitudinal axis of said tubular member.

10. A device as claimed in claim 5, wherein said connecting means comprises an elongated hooking member extending substantially along the longitudinal axis of said tubular member, said hooking member consisting of a metallic wire bent to define a hooking loop and having the ends thereof crimped in said abutment with said ends being spaced apart to permit said end portion of said support wire to be bent over said folding edge between said ends of said metallic wire.

11. A device as claimed in claim 10, wherein said ends of said metallic wire are crimped in said abutment with a retaining force capable of sustaining a load up to about 300 pounds.

12. A device as claimed in claim 10, wherein said metallic wire has a circular cross-section such that the hooking loop defined thereby may further serve as a tool to separate said cable and support wire extending beyond said outlet end, without damaging same.

13. A device as claimed in claim 9, wherein said hooking member is solidary with said tubular member and is provided with an eyelet adjacent the hooking end thereof and with a slot adjacent said outlet end of said tubular member, said hooking member further having an inner peripheral edge defined by said slot and including a folding edge portion adjacent said outlet end for enabling said wire end portion after being inserted into said slot to be bent over said folding edge portion and to thereby provide said bending of said wire end portion adjacent said outlet end.

14. A device as claimed in claim 13, wherein said folding edge portion is rounded to avoid damaging said wire end portion bent thereover.

15. A device as claimed in claim 4, wherein said tubular member has a conical configuration tapering towards said outlet end, and wherein said generally L-shaped slots are diametrically opposite one another.

* * * * *